United States Patent
Carberry et al.

(10) Patent No.: US 6,606,429 B1
(45) Date of Patent: Aug. 12, 2003

(54) ELECTROMECHANICALLY CONTROLLED OPTICAL ELEMENT

(75) Inventors: John Carberry, Talbott, TN (US);
Brian Heffner, Los Altos, CA (US);
Harry Helfer, Sunnyvale, CA (US);
Matthew Derstine, Sunnyvale, CA (US)

(73) Assignee: Neptec Optical Solutions, Inc., Jefferson City, TN (US)

( * ) Notice: Subject to any disclaimer, the term of this patent is extended or adjusted under 35 U.S.C. 154(b) by 0 days.

(21) Appl. No.: 09/473,455

(22) Filed: Dec. 28, 1999

(51) Int. Cl.⁷ .............................. G02B 6/26; G02B 6/42
(52) U.S. Cl. .............................. 385/23; 385/18; 385/19
(58) Field of Search ...................................... 385/16–25

(56) References Cited

U.S. PATENT DOCUMENTS

| | | | |
|---|---|---|---|
| 4,057,719 A | * 11/1977 | Lewis | 250/227 |
| 5,133,030 A | * 7/1992 | Lee | 385/19 |
| 5,175,780 A | * 12/1992 | Sano et al. | 385/47 |
| 5,420,946 A | 5/1995 | Tsai | 385/22 |
| 5,542,013 A | * 7/1996 | Kaplow et al. | 385/25 |
| 5,546,180 A | * 8/1996 | Garel-Jones et al. | 356/73.1 |
| 5,742,712 A | 4/1998 | Pan et al. | 385/18 |
| 6,374,010 B1 | * 4/2002 | Zafferri | 385/23 |
| 6,430,332 B1 | * 8/2002 | Laor et al. | 385/18 |

* cited by examiner

*Primary Examiner*—Brian Healy
*Assistant Examiner*—Kevin S Wood
(74) *Attorney, Agent, or Firm*—Pitts & Brittian, P.C.

(57) ABSTRACT

An optical switch utilizing an actuator to move an optical element into or out of an optical pathway is described. The optical element may be coupled to a movable shuttle and driven by a motor between two rest positions. The shuttle may be latched in the rest positions. The optical element's position may be controlled with a stop that contacts the shuttle to provide accuracy and precision about multiple axes. The material used to construct the actuator's components may aid in repeatedly positioning the optical element with precision. The actuator may incorporate features that allow the optical element to be passively aligned in a bank of actuators to make a M×N switch.

8 Claims, 6 Drawing Sheets

ELECTROMECHANICALLY CONTROLLED OPTICAL ELEMENT

FIELD OF THE INVENTION

This invention relates to the field of fiber optic networks and, more specifically, to devices to position optical elements for directing signals in fiber optic networks.

BACKGROUND

In fiber optic networks, light signals are transmitted along optical fibers to transfer information from one location to another. Optical switches are used to selectively couple light from an input fiber to an output fiber. Optical fibers typically have very small cross-sections and narrow acceptance angles within which light entering the fiber must fall to promote efficient propagation of the light along the fiber. As such, optical switches must transfer light with precise alignment.

One type of electromechanical optical switch operates by moving the ends of an input fiber relative to the ends of the output fiber. One problem with such an electromechanical switch is that the fibers themselves may be thin and subject to breakage if not properly protected. Reinforcing the fibers with stiff protective sheaths, however, makes the fiber less flexible. This increases the force required to manipulate each fiber into alignment and, thus, necessitates more power to operate the optical switch. In addition, with switches that accommodate a large number of input and output fibers, the complexity of maintaining accurate alignment for each optic path greatly increases the cost of the switch.

Another type of electromechanical switch operates by moving a mirror while maintaining the optic fibers and optical pathway stationary. In response to electrical signals, a relay arm moves a mirror into and out of an optical pathway. The relay arm moves the mirror substantially parallel to its reflective surfaces. The travel of the relay arm along that axis is limited by stops that determine the position of the mirror. The relay arm is constrained at the stops by only a single contact point.

One problem with such a switch is that the relay mechanism may not be able to provide the accuracy and precision in positioning the mirror that may be required by some optical switching networks. Accuracy is the ability to achieve a desired position with any given movement. Precision is the ability to repeatedly achieve the same position over a number of movements, regardless of where that position is located. Because the movement of the relay arm is constrained by only a single point of contact with the stopper, the switch may only be able to provide accurate alignment along a single axis (in the direction of the arm's movement). The use of a single contact point may result in position inaccuracies due to the freedom of the relay arm to rotate about additional axis. Furthermore, relay mechanisms are typically constructed of materials that may be susceptible to significant wear from component contact through repeated use. Such material wear may lead to problems with precision placement of the mirror over time, in addition to the position inaccuracies.

Another problem with electromechanical switches is that they use a large electromechanical actuator that may not permit the placement of mirrors in the packing density that may be required for multiple switch arrays.

Other types of systems use electromagnetic actuators, for example, disk drive systems. These systems typically use actuators to position drive components over different regions of a disk. One problem with such electromagnetic actuators is that they require a control servo loop in order to operate. With a servo loop, the position of a component must be actively adjusted to maintain proper positioning. As such, actuators of this type are unable to repeatedly return components to the same position when actuated, without the use of an active control loop. This adds complexity to a system's design and, thereby, may undesirably increase its cost.

SUMMARY OF THE INVENTION

The present invention pertains to an actuator that includes a shuttle, a stopper, and a motor coupled to the shuttle. The motor may be used to drive the shuttle against the stopper at a second position. The stopper may inhibit the rotation of the shuttle about a plurality of axes.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DESCRIPTION

In the following description, numerous specific details are set forth such as examples of specific materials, components, dimensions, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention. The hatching of components in the figures indicates that the components are movable.

The optical switch described herein may be implemented with fixed fiber collimators. The optical switch utilizes an actuator to move an optical element into or out of an optical pathway. The optical element may be coupled to a movable shuttle and driven by a motor between two rest positions. The shuttle may be latched in the rest positions. The optical element's position may be controlled with a stop that contacts the shuttle to provide accuracy and precision about multiple axes. The material used to construct the actuator's components may aid in repeatedly positioning the optical element with precision. In one embodiment, the actuator may incorporate features that allow the optical element to be passively aligned in a bank of actuators to make a M×N switch.

Figure 1A:
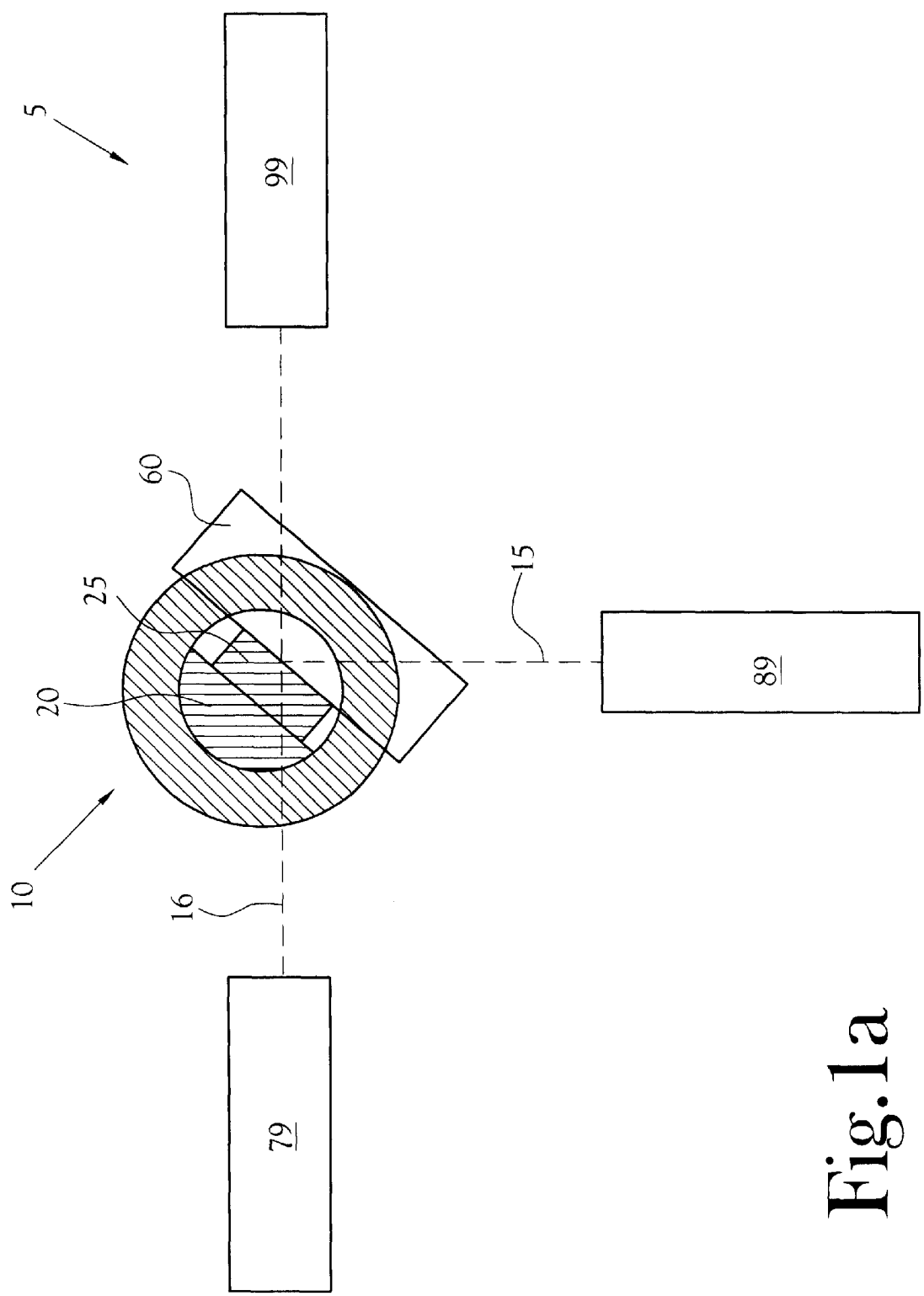
FIG. 1A illustrates one embodiment of an optical switch.

FIG. 1A illustrates one embodiment of an optical switch. Optical switch 5 includes actuator 10 and fiber collimators 79, 89, and 99. In one embodiment, optical switch 5 operates to direct light along optical pathway 15 when activated. The light is directed along optical pathway 15 using actuator 10. Actuator 10 operates to direct light received from one of fiber collimators 89 and 99 to the other fiber collimator. When the switch is active, light from fiber collimator 89, for example, may be received by actuator 10 and directed to fiber collimator 99. In the deactivated position, light is directed along optical pathway 16. As such, light may be propagated from one of fiber collimators 79 and 99 to the other fiber collimator.

In one embodiment, actuator 10 includes mirror 25, shuttle 20, and magnetic coil 60. Magnetic coil 60 operates to drive shuttle 20 and, thereby, mirror 25 into optical pathway 15 (coming out of the page) and out of optical pathway 15 (going into the page). As such, optical pathway 15 and fiber collimators 89 and 99 remain stationary while the mirror 25 is moved. The optical switch is not limited only to components illustrated in FIG. 1A. If other functions are required to be integrated into the optical switch, mirror 25 may be replaced with a different optical element such as a prism or a filter. For example, a wavelength division multiplexed (WDM) switch may be provided by replacing mirror 25 with a partially reflective filter. The use of optical elements, such as mirrors and filters, to propagate light between fiber collimators is well known in the art; according, a more detailed discussion of their operation is not provided.

In one embodiment, light is received by mirror 25 at approximately a 45 degree angle relative to its surface. The optical switch is not limited only to components illustrated in FIG. 1A. In another embodiment, mirror 25 and fiber collimators 89 and 99 may have another configuration that result in a different optical pathway. For example, mirror 25 and fiber collimators 89 and 99 may be positioned such that light is reflected off mirror 25 at angles greater than or less than 45 degrees relative to the mirror's surface.

Figure 1B:
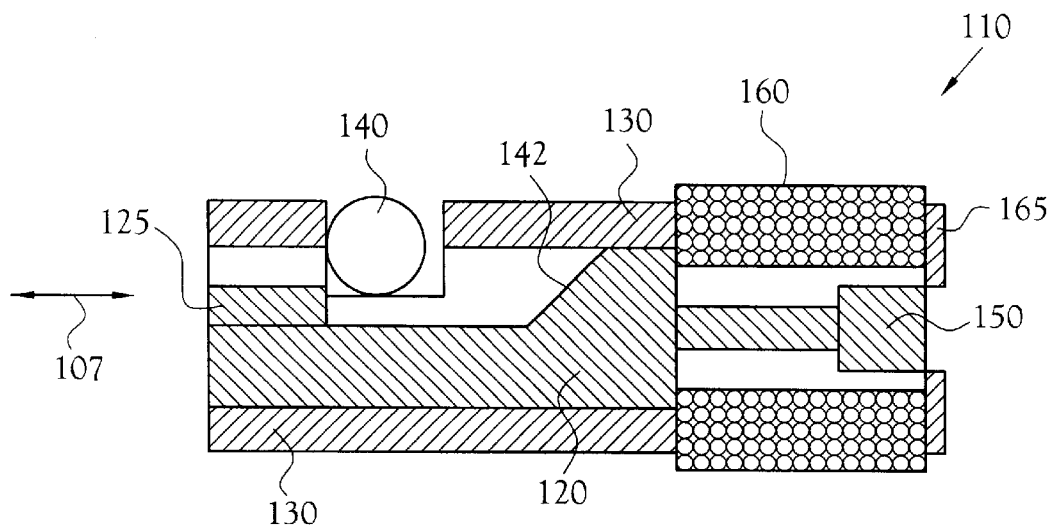
FIG. 1B illustrates one embodiment of an actuator in a first position.
Figure 1C:
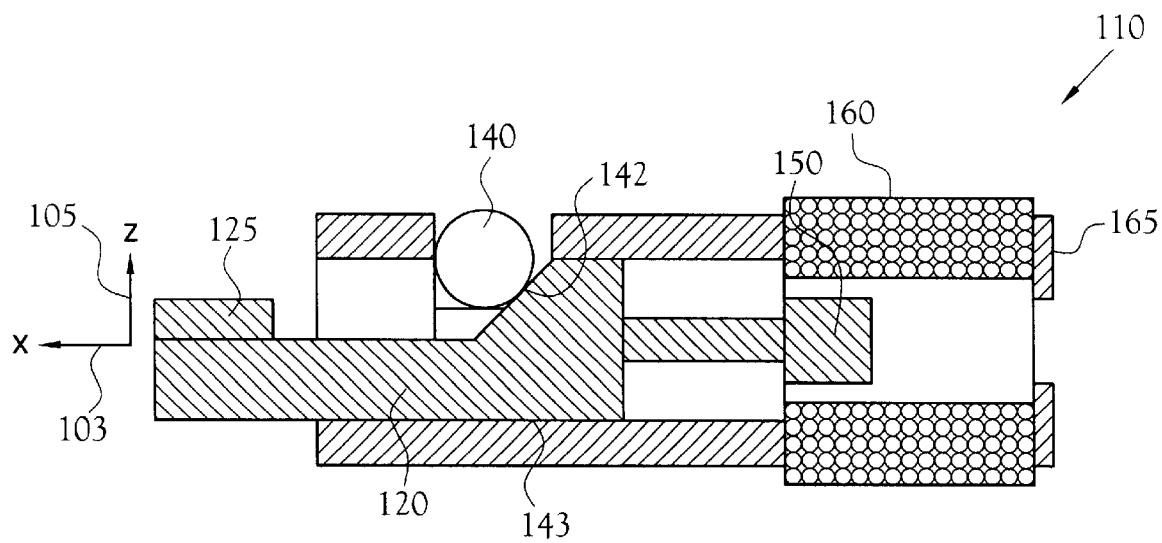
FIG. 1C illustrates one embodiment of an actuator in a second position.

In another embodiment, fiber collimators 89 and 99 may be couplers that include multiple fiber cores. In one embodiment, for example, fiber collimator 89 may include two fiber cores. The fiber collimator may be positioned in a direct line with fiber collimator 99, forming a direct optical pathway. In one position, mirror 25 of optical switch 10 may be located within a direct optical pathway such that light from one core of the multi-core collimator will be reflected back to another core. In a second position, mirror 25 may be moved by the actuator out of the optical pathway to complete the propagation of light from one collimator to the other collimator. Examples of optical element positions of actuator 10 are illustrated by FIGS. 1B and 1C. In an alternative embodiment, actuator 10 may be configured to have additional positions.

FIG. 1B illustrates one embodiment of an actuator in a first position. In one embodiment, actuator 110 includes mirror 125, shuttle 120, stopper 140, housing 130, magnetic coil 160, magnet 150 and latch 165. Shuttle 120 is coupled to mirror 125 at one end and to magnet 150 at its other end. Mirror 125 may be coupled to shuttle 120 using a ball/cone arrangement. In alternative embodiments, mirror 125 may be coupled to shuttle 120 using other methods, for example, using a glass frit or glass epoxy. Attachment methods are well known in the art; accordingly, a detailed discussion is not provided.

In one embodiment, housing 130 is a ferrule that surrounds shuttle 120. In another embodiment, housing 130 may have a different shape (e.g., a square) and a different configuration to constrain shuttle 120. Shuttle 120 is coupled within housing 130 so that it may slide along the length of the housing. Housing 130 guides shuttle 120 along a linear direction of travel 107. However, shuttle 120 may have some freedom of rotation within housing 130. The rotational displacement of shuttle 120 at its second position, illustrated in FIG. 1C, is primarily constrained with stopper 140 as discussed in further detail below. As such, stopper 140 determines the accuracy with which shuttle 120 and, thereby, mirror 125 may be positioned. However, the wear of shuttle 120 may affect the precision with which the mirror may be repeatedly positioned.

Shuttle 120 and housing 130 may be constructed of a material that is selected to minimize their wear from the motion of the shuttle in the housing. In one embodiment, shuttle 120 and housing 130 are constructed from a hard material having a small grain size, for example, ceramic. Ceramic may be polished to higher degree than softer materials such as plastics. When a material is polished, the grain size of the material determines its surface roughness and, thus, its surface area of contact. As a result, when materials come into contact with each other, the area of surface contact is determined by the grain size of the contacting materials. Materials having a small grain size will have a greater number of grain particles in contact with each other over a given surface area. As such, a smaller grain size results in more contact between the surface of shuttle 120 and housing 130.

In one embodiment, for example, the grain size is approximately in the range of 0.3 to 0.5 microns and the distance of travel 107 of shuttle 120 is approximately 2 millimeters (mm). When materials having this grain size come into contact with each other, the contact accuracy may be approximately 0.2 microns. Such a contact accuracy over a distance of approximately 2 mm results in an angular accuracy of approximately 0.0001 radians.

The wear of the material results from the dislodging of surface grains, which may be affected by the size of the grains. The more grains that are dislodged, the greater the wear of the material. However, a large force is required to dislodge a grain of any given size. A surface material having a greater number of small grains will tend to have fewer grains dislodged than a material having a fewer number of larger grains. As such, due to the larger number of grain contacts with small grained surfaces, less discernable wear may result than with a material having a larger grain size.

In another embodiment, other fine grained materials that reduce wear on shuttle 120 and housing 130 may be used, for examples, zirconia, silicon carbide, silicon nitride, and aluminum oxide. In yet another embodiment, shuttle 120 and housing 130 may be constructed from a metal or plastic material. If a larger grained material, such as a metal, is desired to be used, the speed at which shuttle 120 is moved may be slowed to prevent the generation of forces that may increase the wear on shuttle 120 and housing 130. However, the use of ceramics may provide for greater precision than may be attainable with larger grained materials. As such, the proper selection of the material for shuttle 120 and housing 130 may aid in achieving a high precision and repeatability in the positioning of mirror 125.

Grain size, however, is only one of several factors that may contribute to the wear resistance of a material. Other factors that may contribute to the wear resistance of a material include, for example, coefficients of friction, modulus of rupture, tensile strength, compressive strength, and fracture toughness. The operation of such factors is well known in the art; accordingly, a more detailed discussion is not provided.

Actuator 10 is not limited to only having components constructed from the materials described above. In an alternative embodiment, shuttle 120 and housing 130 may be coated with the materials described above. For example, shuttle 120 and housing 130 may be constructed of any rigid material and coated with a wear resistant ceramic such as Titanium Nitride and Aluminum Oxide. The coating may be performed using techniques that are well known in the art, for example, chemical vapor deposition.

Referring back to the components of actuator 10, a latch 165 may be used to secure magnet 150 and, thereby, mirror 125 in the position illustrated in FIG. 1B, when power to the actuator is turned off. This position may be used so as not to form an optical pathway in an optical switch, as discussed above in relation to FIG. 1A.

In one embodiment, latch 165 operates based on a magnetic attraction between magnet 150 and latch 165. Latch 165 may be constructed of a ferromagnetic material. The magnetic attraction between magnet 150 and latch 165 provides the securing, or latching, force to maintain magnet 150 in the latched position. In one embodiment, magnet 150 may be configured to be in direct contact with latch 165 when it is secured. However, such a configuration may require additional power from the magnetic coils.

In an alternative embodiment, the magnetic attraction between magnet 150 and latch 165 may be adjusted such that an air gap resides between magnet 150 and latch 165 in the latched position. The use of an air gap may decrease the power requirements on magnetic coil 160. Latch 165 is not limited to only a magnetic latch. In an alternative embodiment, latch 165 may be another type of latching mechanism, for example, a mechanical latch.

Magnetic coil 160 of actuator 110 generates a magnetic field that operates to disconnect magnet 150 from latch 165 and drive magnet 150 along the length of the coil to the position illustrated in FIG. 1C. The direction of travel of magnet 150 along the length of coil 160 may be controlled by the polarization of magnet 150 and by the direction of current flow through magnetic coil 160. Applying a current to magnetic coil 160 in one direction generates a magnetic field to drive magnetic 150 away from latch 165. By reversing the current in magnetic coil 160, a reverse magnetic field may be generated to drive magnetic 150 toward latch 165. Power may be supplied to magnetic coil 160 using wires (not shown) coupled to the coil.

In this manner, actuator 110 may be switched between the positions illustrated in FIGS. 1B and 1C. The use of an electromagnetic motor allows for switching speeds in the range of approximately 1 to 10 milliseconds. The operation of magnets within magnetic fields is well known in the art; accordingly, a more detailed discussion is not provided. In an alternative embodiment, another type of drive mechanism may be used to drive shuttle 120, for examples, an electric motor and a pneumatic motor.

In one embodiment, magnetic coils 160 may be used to sense the position of shuttle 120. When shuttle 120 is close to a magnetic coil, the coil's inductance is increased. By measuring the inductance of one or more coils of magnetic coils 160, the position of shuttle 120 may be determined based on whether the measured inductance is above or below a predetermined threshold value.

FIG. 1C illustrates one embodiment of an actuator in a second position. When current in magnetic coil 160 is configured to drive magnet 150 away from latch 165, shuttle 120 is moved along the length of housing 130. The motion of shuttle 120 is halted by stopper 140, resulting in the second position of mirror 125 shown in FIG. 1C. In this second position, shuttle 120 is wedged against stopper 140 at contact area 142.

Figure 1D:
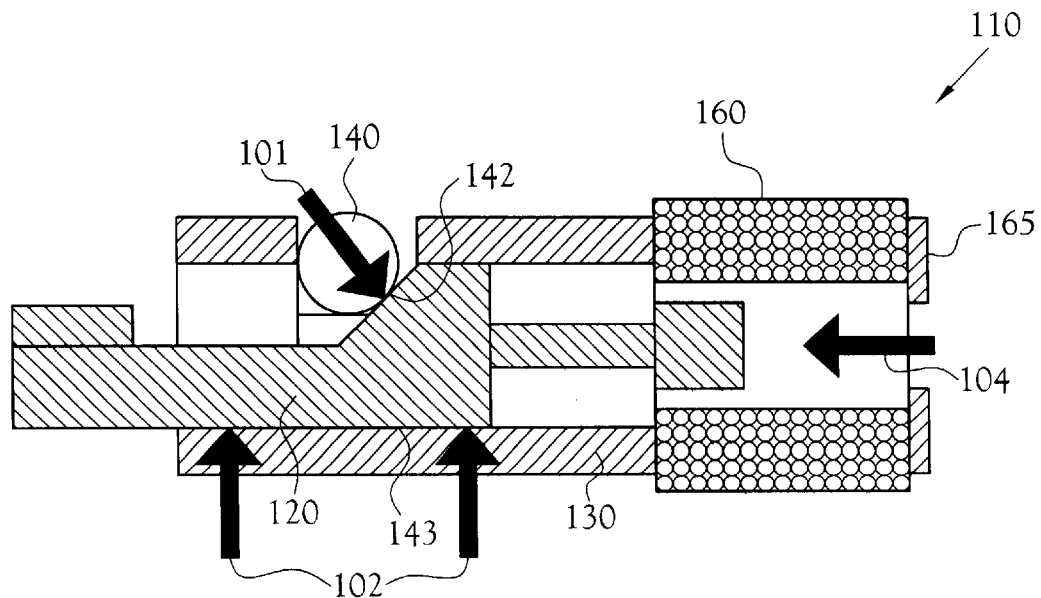
FIG. 1D illustrates one embodiment of the forces on a shuttle in the second position of an actuator.

FIG. 1D illustrates one embodiment of the forces on a shuttle in the second position of the actuator. When shuttle 120 is driven into stopper 140, forces are generated on shuttle 120 to secure it in the illustrated position. The contact force vectors 101, 102, and 104 represent the forces due to stopper 140, housing 130, and coil 160, respectively. Each of the contact force vectors 101, 102, and 104 represents two forces because of the drawing's perspective. In the force diagram, the sum of the force vectors 101, 102, and 104 acting on shuttle 120 is zero.

Referring again to FIG. 1C, the downward forces on shuttle 120 generated at contact area 142 secures shuffle 120 against the housing at contact area 142. Upward forces on shuttle 120 at contact areas 142 and 143 inhibited shuttle 120 from rotation or translation about x-axis 103, z-axis, 105, and the y-axis (into the page). In this manner, contact areas 142, 143 between housing 130, shuttle 120, and stopper 140 provide for self-alignment of shuttle 120. A self-aligning shuttle may enable more precise positioning of mirror 125. As discussed above in relation to FIG. 1A, the second position of actuator 110 may be used to position mirror 125 so that an optical pathway is formed within an optical switch.

Figure 2:
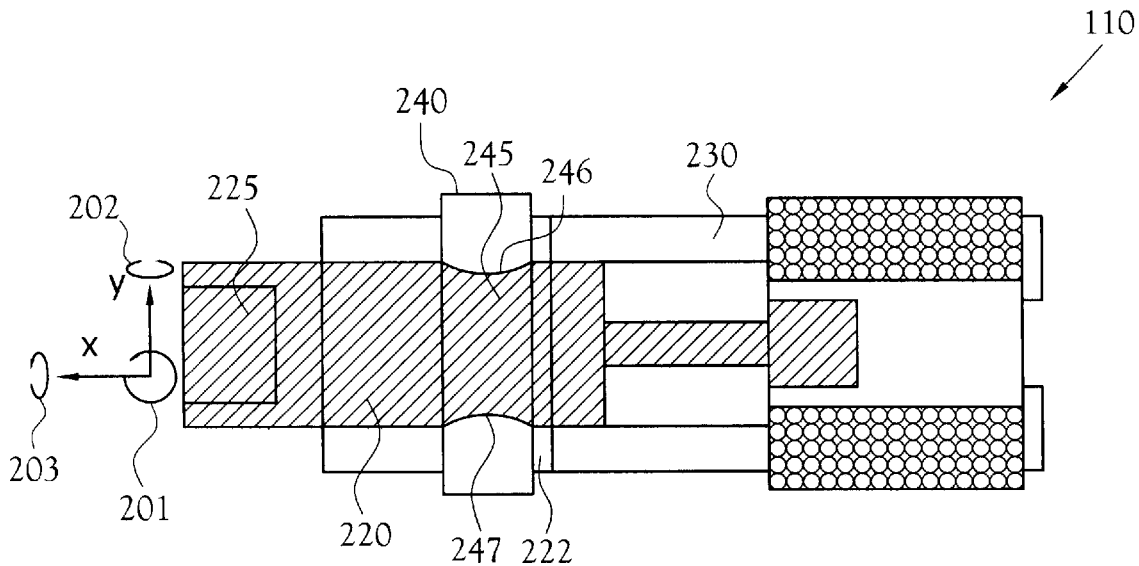
FIG. 2 illustrates a top view of one embodiment of an actuator in the second position.

FIG. 2 illustrates a top view of one embodiment of an actuator 210 in the second position. In this second position, shuttle 220 contacts stopper 240 along shuttle surface 222. A slot may be formed in housing 230 to secure stopper 240. In another embodiment, stopper 240 may be secured to housing 230 with other means, for example, with epoxy.

In one embodiment, the middle section 245 of stopper 240 is milled away to provide for two principal lines of contact 246 and 247 with shuttle surface 222. A two line contact may provided better repeatability of positioning mirror 225 than full surface contact by encouraging shuttle 220 to touch stopper 240 in well defined places. This may avoid a condition where several possible states have the lowest potential energy.

In one embodiment, the lowest potential energy is obtained when shuttle 220 moves the farthest in response to the force generated by the motor driving shuttle 220. When several states have the lowest potential energy, shuttle 220 may rest against its constraints in several ways, all of which may allow shuttle 220 to travel the same distance in response to the force applied to it. If only one state has the lowest potential energy, then if shuttle 220 initially lands in a state with a higher energy, the energy gradient may create a force large enough to move shuttle 220 to the lowest energy state.

In an alternative embodiment, the middle section 245 of stopper 240 may be left unmilled to provide either a flat surface contact or line contacts that may emerge from inaccuracies in machining stopper 240. In one embodiment, stopper 240 is a 1.25 mm diameter LC ferrule rod with surface 222 cut at approximately 35 degrees with respect to a plane in the x, y axes. In other embodiments, stopper 240 may have other shapes and sizes and surface 222 may have other angles.

In one embodiment, the repeatability of positioning mirror 225 may be determine by the contact areas of shuttle 240 with stopper 245 and housing 230. The lines of contact with stopper 240 operate to inhibit x-axis rotation 203 and y-axis 202 rotation of shuttle 220. Furthermore, housing 230 operates to inhibit z-axis rotation 201 and y-axis rotation 202 of shuttle 220. In one embodiment, a repeatability of at least 0.2 microns along the x-axis and 0.1 milliradians of rotation about the x, y, and z-axis of shuttle 220 over a 2 millimeter (mm) length of travel may be achieved. In one embodiment, the extent of material wear of shuttle 240 may also determine the repeatability of positioning mirror 225, as discussed above in relation to FIG. 1B.

The actuator is not meant to be limited to only the configurations illustrated in FIGS. 1A–2. In alternative embodiments, the components may be designed with different configurations to provide for precision alignment of an optical element along multiple axis.

Figure 3:
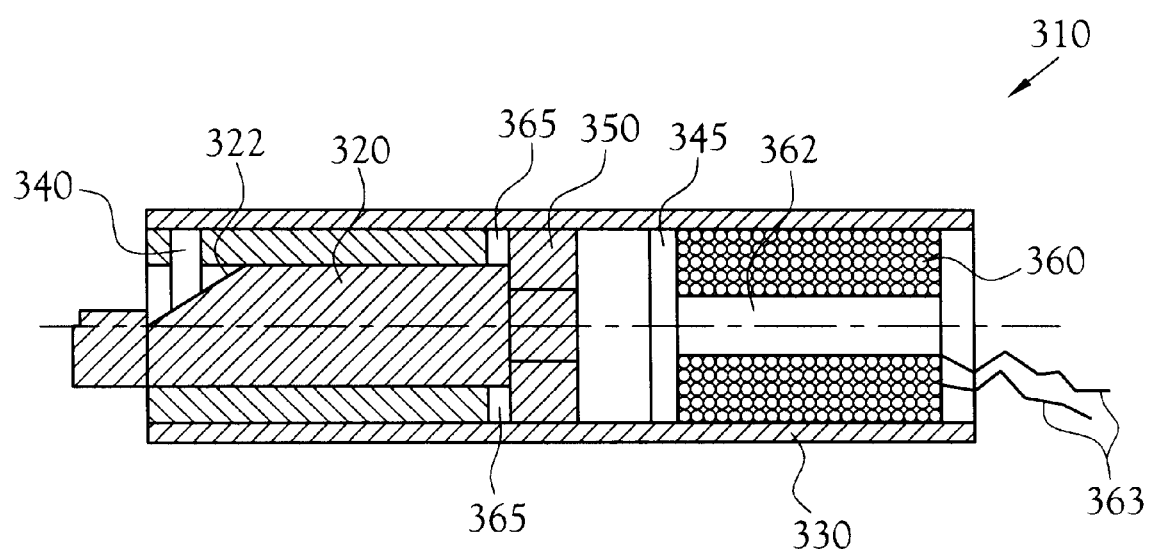
FIG. 3 illustrates an another embodiment of an actuator.

FIG. 3 illustrates an another embodiment of an actuator. In one embodiment, actuator 310 includes a magnet 350 that is driven external to a magnetic coil 360. Wires 363 are coupled to a power source to generate a current in magnetic coil 360. Magnetic coil 360 generates a magnetic field that may be used to drive magnetic 350, similar to that describe above in relation to FIG. 1B. For the embodiment shown in FIG. 3, magnet 350 is external from the core 362 of magnetic coil 360. The magnetic field generated by the coil operates to push and pull magnetic 350 along housing 330. Shuttle 350 is shown in FIG. 3 positioned against stopper 340. In one embodiment, the shuttle may be secured against stopper 340 using a latch 365. Latch 345 may be used to secure shuttle 320 in its other position.

Stopper 340 is a wedge shaped stopper that provides for a flat surface of contact with an angle surface 322 of shuttle 320. If the surface 322 of shuttle 320 has a reciprocal wedge face to precisely match stopper 340, the contact force may be distributed over the entire area of the wedge faces and, thus, the resulting force may be lower. Because, in practice, the two wedge surfaces may not exactly match, the imperfections on the two wedge surfaces may allow shuttle 320 to rest against stopper 340 in slightly different ways, all with approximately the same potential energy as discussed above. This type of constraint may provide better wear characteristics with slightly less precision.

In an alternative embodiment, the actuator includes a shuttle having a wedge face and a stopper consisting of two spheres. The wedge surface of the shuttle may first hit only one sphere, but then the shuttle would rotate and continue to travel until another part of the wedge hit the second sphere. In this case, the small contact area between each sphere and the wedge might lead to high component stress and possibly faster wear, but the precision may be greater.

Figure 4:
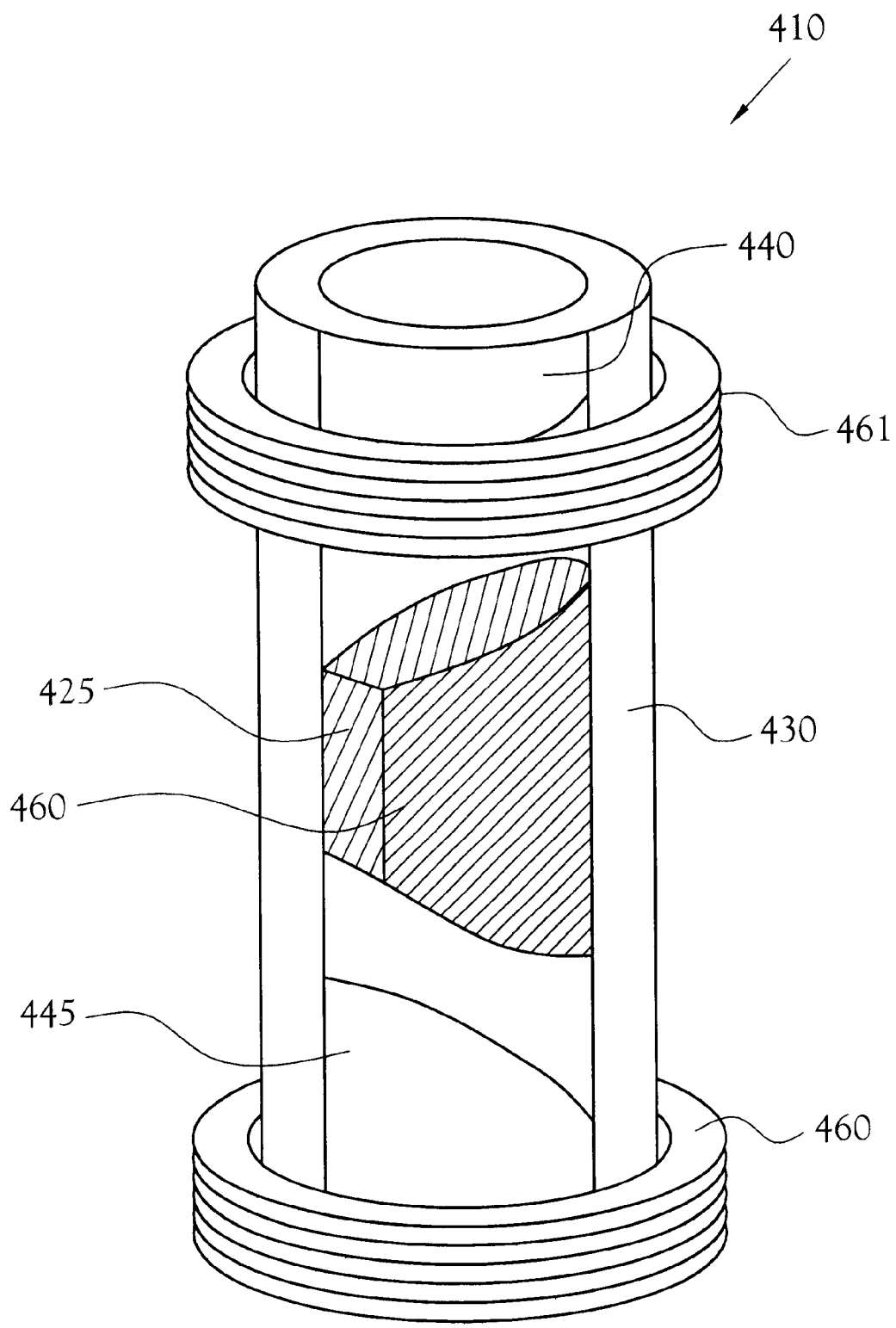
FIG. 4 illustrates yet another embodiment of an actuator.

FIG. 4 illustrates yet another embodiment of an actuator. In one embodiment, actuator 410 includes a movable shuttle 420 contained within the body 430 of the actuator. Body 430 of actuator may be constructed of materials similar to those discussed above in relation to FIG. 1B. Shuttle 420 may be constructed of a ferromagnetic material, for example, unmagnetized nickel-iron or magnetized samarium-cobalt. Mirror 425 is coupled to a side of shuttle 420 to reflect light between collimators (not shown). In another embodiment, shuttle 420 may have an integrated mirrored surface or may have other types of optical elements.

Magnetic coils 460 and 461 are located on opposite ends of actuator body 460, with shuttle 420 confined between them. Either or both magnetic coils 460 and 461 may be energized, as previously discussed, to move shuttle 420 between stops 440 and 445. Stops 440 and 445 may be constructed from a ferromagnetic metal or ceramic material that may either be magnetized or non-magnetized. In one embodiment, for example, actuator 410 may operate by either pushing or pulling shuttle 420 to one end having a latch with a bistable magnet. The other end may also have a magnetic latch or may be non-latching.

In one embodiment, the ends of shuttle 420 are angle cut. Stops 440 and 445 have surfaces that are angled cut reciprocal to the cut surfaces of shuttle 420 to which they contact. The angled cuts provide for self-alignment of shuttle 420 against both stops 440 and 445. The inner walls of actuator body 430 and the outer surface of shuttle 420 may be polished to allow for low friction motion of shuttle 420 within the actuator. The low thermal expansion of the ceramic materials along with the low friction surfaces and the self-aligning shuttle, may result in tighter repeatability and easier alignment of mirror 425 within an optical pathway.

Figure 5:
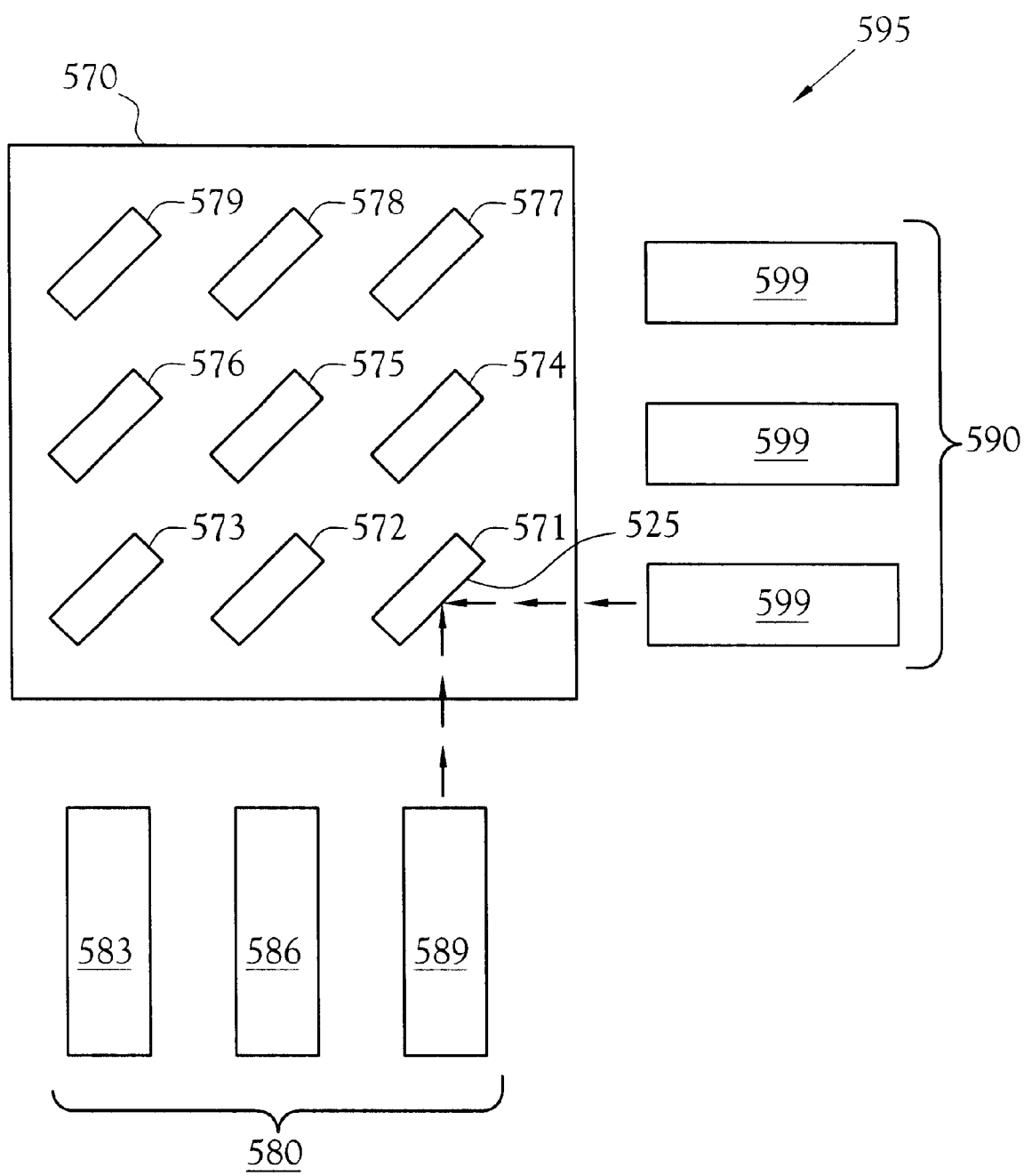
FIG. 5 illustrates one embodiment of an optical switch array.

FIG. 5 illustrates one embodiment of an optical switch array. The optical switch array 595 includes actuator array 570 and a M×N bank of fiber collimators 580 and 590. In one embodiment, actuator array 595 is 3×3 array having nine actuators 571–579; fiber collimator bank 580 has three fiber collimators 583, 586, and 589; and fiber collimator bank 590 has three fiber collimators 593, 596, and 599.

Actuators 571–579 may be similar to those discussed above in relation to FIGS. 1–3. In one embodiment, the actuators are less than approximately 9 mm in length, 3.5 mm in width, and 2 mm in height. In an alternative embodiment, the actuators may have other small form factor dimensions. The use of small form factor actuators may enable optical elements coupled to the actuators (e.g., mirrors) to be passively aligned in optical switch arrays in the density required by some array designs The switching of light between fiber collimators of banks 580 and 590 is accomplished by selectively activating actuators within actuator array 570. For example, by activating actuator 571, light propagated from fiber collimator 589 may be reflected off a mirror surface 525 of actuator 571 to fiber collimator 599. By deselecting actuator 571 and selecting actuator 574, light from fiber collimator 589 may then be directed to fiber collimator 596.

The optical switch array is not limited to only the configuration and size illustrated in FIG. 5. In an alternative embodiment, the optical switch array may have more or less than nine actuators and three fiber collimators per bank. In an alternative embodiment, the optical switch array may be configured to reflect light at other angles or may utilize other types of optical elements, for example, a filter as discussed above.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An actuator for interacting with an optical pathway, comprising:

an optical element;

a shuttle coupled to said optical element, said shuttle having a first surface;

a housing, said shuttle constrained to move along an axis of said housing between a first position and a second position;

a stopper in fixed relation to said housing, said stopper contacting said first surface of said shuttle in said first position, said stopper inhibiting said shuttle from rotat ing about said axis with said shuttle in first position;

a coil in fixed relation to said housing, said coil generating a magnetic field when energized; and a magnet coupled to said shuttle, said magnetic field acting on said magnet and causing said shuttle to move between said first position and said second position.

2. The actuator of claim 1 wherein said shuttle has a second surface in slideable contact with an inside surface of said housing, and said second surface and said inside surface are constructed of a small grain material.

3. The actuator of claim 2 wherein said small grain material is a ceramic.

4. The actuator of claim 1 wherein said shuttle has a second surface in slideable contact with an inside surface of said housing, and said second surface and said inside surface are a ceramic material.

5. The actuator of claim 1 further including a latch in fixed relation to said housing, said latch securing said shuttle in said second position.

6. The actuator of claim 5 wherein said latch is magnetic.

7. An actuator for interacting with an optical pathway, comprising:

an optical element;

a shuttle coupled to said optical element, said shuttle having a first surface;

a housing, said shuttle constrained to move along an axis of said housing between a first position and a second position;

a stopper in fixed relation to said housing, said stopper contacting said first surface of said shuttle in said first position;

a coil in fixed relation to said housing, said coil generating a magnetic field when energized;

a magnet coupled to said shuttle, said magnetic field acting on said magnet and causing said shuttle to move between said first position and said second position; and a latch in fixed relation to said housing, said latch securing said shuttle in said second position.

8. The actuator of claim 7 wherein said latch is magnetic.

* * * * *